3,846,156
PROCESS FOR PRODUCING A SOFT, DRAPABLE ARTIFICIAL LEATHER
Gerhard Seibert, Aachen-Bildchen, and Hans-Jurgen Pitowski, Miltenberg, Germany, assignors to Akzo N.V., Arnhem, Netherlands
No Drawing. Filed May 3, 1972, Ser. No. 249,765
Claims priority, application Germany, May 11, 1971, P 21 23 198.1
Int. Cl. B44d 1/44
U.S. Cl. 117—63                      12 Claims

ABSTRACT OF THE DISCLOSURE

Process of preparing a soft, drapable artificial leather by applying a polyurethane solution as a coating layer onto a textile substrate, coagulating the polyurethane and then washing and drying the coated layer wherein the polyurethane solution being coated contains 300 to 1500% by weight of sodium sulfate, with reference to the amount of polyurethane, and has a viscosity of at least 20 and preferably more than 100 poises (20° C.). The finished product has both a microporous and macroporous structure with the appearance and handle of a soft, flexible leather as well as other desirable leather-like properties and is especially useful for clothing articles or upholstery goods.

---

This invention generally relates to the production of an artificial leather comprising a textile support or substrate and an elastomeric top layer or coating. Such products should have at least the following properties in addition to a leather-like appearance: permeability to water vapor, a soft leather-like handle and a sufficiently firm bond between the textile substrate and the elastomeric layer.

The production of artificial leather having such properties has been described in numerous patent specifications and other well-known references. One always begins from the presumption that it is desirable to produce a top or outer layer with very small pores, i.e. so-called "micropores." The properties of known products are generally satisfactory if the produced artificial leather is used to provide shoe uppers or artificial leather goods such as handbags, briefcases and the like. However, if the artificial leather product is to be used for clothing articles, it must be much softer and have a draping quality which cannot be achieved by prior processes. Suitable support materials or substrates for such artificial leathers are open-meshed woven and knitted fabrics and also very fine felts or nonwoven webs, but these are extremely difficult to coat by the usual processes. Moreover, when using known coating materials, for example polyurethane solutions or gels, it is almost impossible to prevent the polymer material from penetrating the substrate so that the textile character of the substrate is lost.

Numerous processes have become known for improving the properties of an artificial leather in various ways.

In French Pat. No. 1,376,763 there is described a process in which a thin layer of synthetic resin is applied to the tips of the fibers of a cut fibrous pile of a dense textile substrate in such a way that the layer of polymer is capable of a certain amount of displacement relative to the textile support. Some softness can thereby be achieved in the coated surface but the permeability to water vapor is insufficient and the product has a coarse grain which is not desirable in artificial leather and which reduces the resistance of the coating to abrasion or other damage.

German Patent Application No. 1,903,402 discloses a process for producing an artificial velours leather by applying two polymer layers successively to a substrate, the lower polymer layer containing a coagulation regulator for the formation of a microporous structure and the top layer containing a coagulation regulator for the formation of a macroporous structure. The micropores and macropores are therefore not uniformly distributed throughout a single top or outer layer and consequently the resulting products do not have the desired properties.

Pores may also be formed by mixing the elastomeric polymer composition with solid particles which can subsequently be dissolved out, and various procedures are known in which such solid additives are used. French Pat. No. 1,515,026, for example, describes the production of such porous materials. Additives such as sodium chloride or sugar which have been ground to a particle size of 7 to 25 microns are dispersed in a polymer composition which is then coated on a support, and the bulk of solvent is then removed by evaporation. Finally the product is washed to remove the additive.

U.S. Pat. No. 3,387,989 discloses a process in which a pile fabric with napped fibers is coated with a mixture of polyurethane and a solid pore-forming substance in such a way that the pile or nap extends at least partly through the polymer layer. The pore-forming substance should consist of very fine particles which do not change their form during the process, for example sodium chloride or magnesium sulfate, thereby providing a microporous layer. An abrasion-resistant, impervious outer layer is applied thereafter with the nap extending therethrough.

Apart from the above-mentioned salts, potassium chloride and sodium and potassium sulfate have been described as additives for the polyurethane coating composition in French Pat. No. 1,565,893. The quantities of such salts being added are 5 to 100%, based on the quantity of polyurethane, and it is specifically stated in this French Patent that quantities of more than 100% cause a marked deterioration in the quality of the elastomeric coating.

One object of the present invention is to provide a process of producing an artificial leather, particularly one in which an elastomeric polyurethane polymer is coated as a layer on a textile substrate, whereby the finished product not only has a leather-like appearance and the vapor permeability properties of known products but also exhibits a very soft handle and flexibility or suppleness similar to that of fine leather goods used for clothing or upholstery. Another object of the invention is to obtain such a soft, drapable leather-like product in which a good bonding is achieved between the elastomer layer and the textile substrate, even when using a relatively soft and open fabric or nonwoven fleece or web as the substrate. At the same time, it is an object of the invention to achieve a process for producing such an improved polyurethane type of artificial leather which is relatively economical and simple to carry out under conditions of quality control to ensure uniform properties and appearance. These and other objects and advantages will become more apparent upon consideration of the following detailed specification.

It has now been found, in accordance with the invention that a soft, drapable and supple artificial leather of very good quality and especially suitable for clothing and upholstery can be obtained by the generally known steps of applying a polyurethane polymer in a solvent medium as a coating or surface layer onto a textile substrate, coagulating the applied layer by bathing with a nonsolvent for the polymer, e.g. with an aqueous bath, and then washing and drying to obtain a porous elastomeric layer, provided that the coating application is made with a liquid substance which is a solution of the polyurethane polymer containing 10 to 30 parts by weight of polyurethane and 300 to 1500% by weight of sodium sulfate (with reference to the polyurethane polymer) in 90 to 70 parts by weight of an organic solvent which is miscible in water and is a nonsolvent for the sodium sulfate, the viscosity of this solution being at least 20 poises and preferably at least 100 poises (measured at 20° C.). After applying this viscous solution and bathing it for coagulation, preferably in a conventional aqueous bath, it is then washed to remove the organic solvent and the sodium sulfate, e.g. with water on an aqueous wash liquid, and finally dried to form an elastomeric coating uniformly permeated with both micropores and macropores.

The sodium sulfate is used as a finely divided pore-forming solid material which may have a particle size of up to about 350 microns. In general, the particle size of the initially added sodium sulfate ($Na_2SO_4$) can range between 10 and 350 microns, preferably about 40 to 250 microns. One preferably works with a relatively wide range of particle size to avoid excessive sorting or screening so that the average or mean particle size will usually fall between about 100 to 200 microns. This permits a relatively good distribution of both micropores and macropores in the finished product and a very advantageous soft and flexible handle.

The term "polyurethane polymer" is employed herein to refer to the well known class of elastomeric high molecular weight polymers which have become recognized as the most acceptable polymer for preparing artificial leathers. Attention is therefore directed to the large body of prior art relating to this use of polyurethanes either alone or in combination with other compatible film-forming thermoplastic polymers such as polyvinyl chloride in minor amounts with reference to the total polymer content of the elastomer. See, for example, the following U.S. Pats. Nos.: 3,483,167; 3,491,053; 3,527,653; 3,645,775; 3,100,721; 3,208,875; 3,190,765; 3,190,766; 3,238,055; 3,214,290; and the like. It is preferable to employ polyurethane itself or an elastomer composition consisting essentially of polyurethane. Pigments or other substantially inert additives can be added to the elastomeric polymer from the very beginning of the process so as to provide a highly valuable film-forming composition consisting essentially of the polyurethane polymer and the sodium sulfate in the organic solvent medium which dissolves the polyurethane polymer but not the sodium sulfate. Suitable solvents are also disclosed in great detail in the above-noted patents.

The process according to the invention enables a porous elastomeric polymer coated layer which is permeable to water vapor and which has an excellent soft handle to be obtained on a suitable support or substrate such as a bonded fleece or nonwoven web, a woven fabric or a soft open-meshed knitted fabric in such a way that the textile character of the substrate is preserved and yet a sufficiently firm bond is obtained between the substrate and the coated layer.

The details of the process of the invention can be briefly illustrated as follows: Sodium sulfate is added to a solution of a suitable film-forming polyurethane polymer in a solvent such as dimethylformamide which is miscible with water and which must be a nonsolvent for sodium sulfate, the quantity of sodium sulfate added being 300 to 1500%, based on the weight of the polyurethane to provide a thick solution or paste. This relatively viscous solution of the polymer is coated on a textile substrate and then rinsed or bathed with water to coagulate or solidify the polyurethane. Sodium sulfate is then washed out with water so that after drying a product comprising the textile substrate and a porous synthetic elastomer coating is obtained in which coarse pores (macropores) are distributed in an otherwise microporous polymer layer or film.

It was surprising to find that the desired supple handle and draping qualities of an elastomeric polyurethane coating on a relatively soft or open textile substrate cannot be obtained if the pores of this polyurethane coating consist exclusively of micropores. This kind of microporous structure had always been assumed to be essential to achieve all of the desired leather-like properties as well as a good bond on the substrate. In fact, however, it is necessary to have additional larger pores (above the normal micropore range) preferably with a uniform distribution of these larger pores throughout the polymer layer or coating.

The use of $Na_2SO_4$ in amounts of 300 to 1500% by weight in the coating solution or paste, based on the amount of polyurethane, ensures numerous advantages both as regards the coating layer obtained and also as regards the processing techniques of various alternative steps. The advantages, applied singly or in combination, enable a product to be produced which is perfectly adapted to its intended use, especially because there is practically no limit to the choice of suitable textile substrates for purposes of the present invention. The advantages of the high concentration of sodium sulfate in the coating solution or paste can be enumerated as follows:

1. One of the chief advantages is the fact that the increase in viscosity of the coating composition to more than 20 poises (20° C.) and preferably more than 100 poises (20° C.) can easily be controlled by the amount of salt added so that even relatively open-weave fabrics or loose-knit goods can be coated by means of simple coating rollers without any risk of the coating solution penetrating into the fabric. An increase of the viscosity of the coating composition by increasing the viscosity of the polymer used as starting material, for example by using a polymer with a higher molecular weight, is possible only to a very limited extent as is also an increase in the viscosity of the composition by increasing the concentration of the polyurethane, which in any case usually has an adverse effect on the softness and permeability to water vapor of the final product.

2. The high salt content and the viscosity of at least 20 poises (20° C.) of the coating composition also "stabilize" the coated woven or knitted fabrics in the sense of maintaining its dimensional stability or coherency, so that even a web of a relatively unstable knitted fabric can be drawn off and transported behind the coating rollers without requiring special apparatus or supporting devices. If coating materials which contain no salt or which have a lower sodium sulfate content and/or lower viscosities are used, the web of knitted fabric tends to roll up behind the coating rollers or at least to curl up at its edge.

Additional stabilization of the web of coated woven or knitted fabric is achieved when it is immersed in water because, during coagulation of the polyurethane and at a time when the polyurethane is still very soft and plastic, only a small proportion of the sodium sulfate is dissolved out by the water while most of the sodium sulfate reacts with water to form a hydrate which remains solid in water at a temperature below 33° C. This stabilizes the coated fabric or web to such an extent that the fabric can easily be passed over deflecting rollers in the water bath without the use of spreading or stretching devices to keep the web spread out. If coating pastes with a lower sodium sulfate content are applied to loose-knitted goods, the web rolls up in response to even slight variations in tension which are unavoidable due to contraction during coagulation of the polyurethane. These same disadvantages arise when other additives are used, e.g. sodium chloride, even if they are present in very large quantities.

3. The large quantities of sodium sulfate used according to the invention require little or no precautions during the dispersion or distribution of the salt in the initial polyurethane solution. Moreover, it is not necessary to employ additional grinding and dispersing processes such as are usually necessary when losing low salt concentrations to prevent rapid deposition of the salt in the polyurethane solution. Thus, commercial sodium sulfate which has been freed from agglomerates by a simple sifting process, using sieves with a mesh opening of 350 microns can be stirred directly into a polyurethane solution and the mixture may then be conveyed directly to a conventional coating apparatus. For example, a 16% polyurethane solution to which 1000% by weight of sodium sulfate has been added, based on the amount of polyurethane, may be left to stand 30 minutes without the salt sedimenting or agglomerating to such an extent that a product with uneven properties would be prdouced due to uneven distribution of the salt.

4. For obtaining certain properties, which will be explained hereinafter, it is frequently very advantageous to apply several similar or different elastomer coatings as successive layers on top of one another. This particular technique is greatly facilitated by using the coating solutions or pastes according to the invention because when the coating has partly coagulated (e.g. within about 30 to 120 seconds in water), the coated web can be passed through a pair of rollers which are lightly pressed against the web to remove moisture adhering to it and from there the web can be conveyed directly to a second coating apparatus without any guide apparatus such as spreading rollers, pin chains or the like, i.e. substantially free of tension. A second coating similar to the first or one which is substantially free of salt may then be applied to the first coating. No difficulty in bonding between the two layers can arise because, apart from stabilizing the textile substrate, the paste containing salt ensures even while it is still uncoagulated that a second polyurethane coating paste will adhere firmly to the first coating. This can be observed from the fact that a textile substrate coated with a paste which contains salt can be coated directly with a polyurethane solution in a second application apparatus without first being immersed in a bath of water. Application of a second coating in previously known processes can usually only be achieved by strictly observing those conditions of the process which concern the length of time between the two applications, the temperature and atmospheric moisture. Moreover, the two coating compositions in known processes must be accurately adjusted to each other. When using the coating pastes according to the present invention for the first coating, the conditions for the second application are surprisingly quite uncritical. It is therefore very easy to combine two or more layers with the desired properties according to the present invention.

5. Another advantage of the coating composition used according to this invention is the fact that production of a coarse, deep grain can be achieved not only after the coagulation, washing and drying steps of the process, e.g. by thermal embossing of the finished porous polyurethane layer which has a high bulk and firm texture, but also such graining can already be carried out during the coagulation step of the process. Provided certain precautions are taken, this graining during coagulation can be achieved even when using coating compositions with lower salt contents. However, when using the pastes or coating substances according to the invention, this embossing process wherein a top or surface coating which has been partly coagulated in water for 10 to 120 seconds is embossed with a suitably profiled roller can be readily achieved without any difficulty or special handling, and one can obtain products which have a textured surface, e.g. in the nature of imitation velours, after the dried top coating has been buffed.

The coating compositions according to the invention which contains sodium sulfate in large amounts are not affected by contamination with water which is liable to be carried into the coating composition with the solvent used or with the sodium sulfate if it is not completely anhydrous. The maximum permissible water content in a given polyurethane solution is that at which separation of the polymer, solvents and water into two or more separate phases just fails to occur, i.e. just prior to gellation of the composition into a multi-phase system. The moisture in the initial sieved sodium sulfate should not lead to any substantial agglomeration. On the other hand, it can be advantageous to add small quantities of water or an aqueous medium to the coating compositions used according to the invention in order to accelerate the coagulation process. In this respect, it is most advantageous that the presence of appropriate quantities of water have no adverse effect.

To prepare the coating solution or paste used according to the invention, the following provides an especially desirable procedure. A solution of polyurethane in dimethylformamide, generally one having a concentration of 35%, is first introduced into a mixing vessel and then adjusted to the required concentration by adding a suitable mixture of dimethylformamide and water, and a quantity of a conventional pigment dispersion required to produce the desired color tone is also added. The solution is then homogenized by stirring either at room temperature or at elevated temperatures up to about 50° C. in order to reduce the viscosity, the time required to complete homogenization being on the order of about 15 minutes. The desired quantity of sodium sulfate is then added gradually in the course of several minutes with constant stirring, preferably at temperatures below about 33° C., especially where any substantial amount of water is present. There is no need to take special care to ensure accurate addition of the salt. As stirring is continued, the air stirred into the solution or paste is removed at a pressure of about 100 mm. Hg and the composition is then ready for coating.

The choice of polyurethane concentration will depend on various factors but not on the required viscosity of the coating paste since this can be adjusted more easily by the addition of sodium sulfate. At a given concentration of salt, the polyurethane concentration influences the softness of the end product in that the softness decreases with increasing polyurethane content of the coating paste. At the same time, however, the internal strength of the porous polyurethane film or layer and the strength of the bond between the textile substrate and its coating increase. The absorbtivity of the coating also decreases with increasing polyurethane concentration, which may sometimes be desirable when applying a finish to produce a desired gloss. The absorbtivity can also be adjusted, however, by embossing with heated rollers or by changing the $Na_2SO_4$ concentration. Lastly, the permeability of the porous coating to water vapor is also affected by the concentration of polyurethane in that it decreases with increasing polyurethane content. Taking all these factors into account, it has been found most advantageous to use polyurethane solutions which contain between about 10 and 30% by weight of polyurethane and preferably between 15 and 22% by weight (with reference to the total weight of polymer and organic solvent).

Application of the viscous coating composition is carried out with known coating apparatus. To obtain a particular thickness of the coating application it has been found advantageous to guide the textile substrate as a sheet or web to be coated over a driven roller above which a coating knife or blade is arranged in such a way that the thickness of the coating can be adjusted by changing the gap between the substrate and the coating knife. Any suitable thickness of coating can be obtained with gaps preferably between about 0.3 and 2.0 mm. The thickness of the applied coating in terms of weight per unit area is generally between 40 g./m.$^2$ and 300 g./m.$^2$. Provided that the coating knives are suitably adjusted, this thickness depends not only on the $Na_2SO_4$ content and the polyurethane content of the coating composition but also on the structure of the textile substrate because in the case of loose-weave or loose-knit fabrics the coating paste tends to be pressed into the substrate by the coating knife. Therefore, in the case of these open-mesh substrates, the minimum application of polyurethane necessary to obtain a final product with a leather-like character is slightly higher than 40 g./m.$^2$. It is usually not necessary or desirable to apply more than 300 g./m.$^2$ in a single coating step because a more satisfactory final product can be obtained more easily with several coating applications.

The abrasion resistance of the porous elastomeric layers or surface coatings depends, of course, on the apparent thickness of the polyurethane layers and decreases with decreasing thickness. However, this is not a serious disadvantage of the process of the invention because the elastomeric coatings are normally subjected to an after-treatment to produce a more leather-like appearence, for example an after-treatment involving embossing a grain in the surface coating with heated rollers or the like and applying a dressing to obtain the desired color and gloss in the same way as in natural leather. These two treatments result in an artificial leather which has sufficient abrasion resistance for clothing and upholstery purposes while still retaining the desired softness and drapability.

The process according to the invention also permits the application of a second substantially microporous polyurethane layer on or over a first layer which is uniformly permeated with substantially larger pores without thereby losing the desired softness and draping qualities. The thickness of the second microporous polyurethane layer may be between about 0.2 and 1 mm. The abrasion resistance of this surface coating, which remains practically devoid of macropores, is sufficient for heavy wear or greater exposure to abrasion, and the product produced in this way is perfectly suitable for use as shoe uppers.

Another advantage of top coatings produced from two such successive applications of the coating materials, one on top of the other, is that polyurethanes with distinctly different properties can be used. Thus, a very soft polyurethane polymer is advantageously used for the first coat while a harder polyurethane polymer with a higher thermal resistance is more desirable for the top coat or surface layer. The first coat can then serve to improve the handle and flexibility of the product while the top coat renders the product more resistant to wear and tear.

The process of the invention is now explained more fully with the aid of the following examples. These examples are illustrative only and should not be considered exclusive in view of the many well known variations in this art which are fully compatible with the principles of the present invention.

All of the polyurethane polymers are prepared according to conventional procedures to provide linear film-forming products capable of being coagulated or solidified with an aqueous bath. The percentages in the examples are by weight unless otherwise noted.

EXAMPLE 1

A 35% solution of polyurethane in dimethylformamide having a viscosity of 2050 poises (20° C.) is prepared from a polyurethane which is a reaction product of polybutylene adipate having an average molecular weight of about 1000, diphenylmethane-4,4'-diisocyanate and butanediol in the molar ratio of 1:2:1.

A mixture of 795 g. of dimethylformamide and 110 g. of water as well as 110 g. of a pigment dispersion of pure 30% iron oxide brown in a 10% solution of polyurethane in dimethylformamide are added to 762 g. of the above 35% polyurethane solution, and the resulting mixture is homogenized by stirring at 30° C. for 15 minutes. 2500 g. of sodium sulfate which has been passed through a sieve with a mesh of 350 microns and which has an average patricle size of 150 microns are then added with continued stirring, and after another 5 minutes of stirring, most of the air introduced into the mixture is removed at a pressure of 100 mm. Hg within about 5 minutes while further stirring. The resulting paste has a viscosity of 115 poises (20° C.).

The textile substrate used for the coating is a staple fiber rayon fabric with a canvas weave, which fabric has a weight per unit area of 78 g./m.$^2$ and a surface density of 35% (according to Walz, Koch-Wagner, "Textile Prüfungen," Dr. Spohr-Verlag, 1966). This fabric is passed over a driven roller on which a coating knife is so arranged that the gap between the knife and the fabric is 0.8 mm. The coating paste described above is applied as a uniform layer on this fabric by means of the coating knife while the fabric web or sheet is drawn off at a rate of one meter per minute and after a retention or travel time of 30 seconds after the coating knife, the fabric is introduced into an aqueous bath. On immersion of the coating containing $Na_2SO_4$ into the bath of water at 20° C., the polymer begins to coagulate, and after 10 minutes in this bath in which the fabric web is deflected several times over rollers, it has substantially solidified. Thereafter the coated fabric is introduced into a second bath of water at 60° C. in which it is washed free from both the organic solvent and the $Na_2SO_4$.

The product obtained after drying the coated fabric is a two-layered sheet product consisting of a textile substrate and a polyurethane layer firmly bonded thereto, the polymer layer having a weight per unit area of 112 g./m.$^2$ and being uniformly permeated with coarse pores and with micropores distributed between the coarse pores. The product is soft with a good leather-like handle and a permeability to water vapor of 5. 1 mg./m.$^2$ hr., according to IUP 15 "Leder" 12 (1961), pages 86–88. A textile structure is still apparent on the rear or noncoated surface, but the yarn or fabric is so permeated with the polymer that the bond between the polymer layer and the fabric is greater than the structural strength of the polymer layer itself. The product may subsequently be grained with a finish as normally applied to natural leather.

EXAMPLE 2

A coating paste containing sodium sulfate as described in Example 1 is applied to the smooth side of a Perlon jersey velours which has been napped on one side only (weight of cloth=100 g./m.$^2$, bursting elongation=40%, bursting strength=8.3 kg./cm.). The gap between the coating knife and cloth is adjusted to 1.2 mm. so that the amount of polyurethane applied is 164 g./m.$^2$. The coating substance is solidified, washed and dried as described in Example 1 to produce an article consisting of a knitted fabric and a porous polyurethane layer. The veloured rear surface of the fabric has a pure textile character since none of the polymer penetrates through the fabric from the other side. The material has a permeability to water vapor of 4.2 mg./m.$^2$ hr. and has an excellent soft and full handle. After graining and finishing, the product is eminently suitable for use as artificial leather for clothing.

EXAMPLE 3

In a modification of the process described in Example 2, the amount of coating applied is reduced by adjusting the coating knife to a gap of 0.6 mm. so that the amount of polyurethane applied is 97 g./m.$^2$. The product obtained is again very soft and has a good draping quality and a permeability to water vapor of 4.7 mg./m.$^2$ hr.

EXAMPLE 4

In another process, the coated knitted fabric described in Example 3 is immersed in water for 40 seconds, removed from the water bath and passed through a pair of driven rollers which apply light pressure to the material to remove the water adhering to its surfaces. The material is then passed over a roller equipped with a coating knife to apply a second coating paste consisting of 19% by weight of the polyurethane described in Example 1, 7% of water, 1% of the pigment dispersion described in Example 1 and 73% of dimethylformamide, the gap between the edge of the coating knife and upper surface of the fabric being adjusted to 1 mm. so that the total amount of polyurethane applied is 154 g./m.$^2$. After application of this second successive coating, the coated fabric is passed through air for 6 minutes (22° C. and 60% relative humidity) and then drawn through a water bath at 25° C. over deflecting rollers for 8 minutes and finally freed from solvent and $Na_2SO_4$ in a second water bath at 50° C. After drying, the resulting leather-like article has a microporous layer uniformly permeated with large pores on the smooth side of the fabric, the elastomer being firmly bonded to the fabric due to the elastomer penetrating into the fibers or threads of the fabric. Above this first bonded layer there is a second essentially microporous layer while the opposite napped surface of the fabric has a pure textile character.

The product has a very soft handle and a permeability to water vapor of 3.1 mg./cm.$^2$ hr. The product is then dressed to produce an artificial leather with high abrasion resistance.

EXAMPLE 5

Comparison experiment

The experiments carried out in Examples 2 to 4 are repeated but the paste applied as the first coating, although similar in composition to that in Example 2, contains no salt and has a viscosity of only 13 poises (20° C.). Consequently, the web is more difficult to guide due to its tendency toward creasing and rolling up, and the coating paste penetrates the napped fabric so extensively that the fibers on the lower napped surface are matted together. The products produced have a rubber-like, very hard and unpleasant handle and are unsuitable for use as artificial leather although they exhibit a permeability to water vapor of 1.7 to 1.85 mg./cm.$^2$ hr.

EXAMPLE 6

The fabrics described in Example 1 are treated with two coats of paste as in Example 4, using a polyurethane which is a reaction product of polyethylene adipate having an average molecular weight of 2000, diphenylmethane-4,4'-diisocyanate and ethylene glycol in the molar ratio of 1:4.3:3.3 and which has a viscosity of 1900 poises at 20° C. when in the form of a 35% solution in dimethylformamide. The pastes are prepared as described in Example 1 and have the following compositions:

(A)

1000 g. of 35% polyurethane solution in dimethylformamide; 218 g. of water;
968 g. of dimethylformamide;
4375 g. of $Na_2SO_4$ passed through a sieve having a mesh of 350 microns (average particle size=150 microns); and
105 g. of 10% dispersion of carbon black in a 10% polyurethane solution in dimethylformamide.
Paste viscosity=410 poises (20° C.).

(B)

1000 g. of 35% polyurethane solution in dimethylformamide;
950 g. of dimethylformamide;
4375 g. of $N_2SO_4$ passed through a sieve having a mesh of 350 microns (average particle size=150 microns); and
195 g. of a dispersion of carbon black as in (A).
Paste viscosity=650 poises (20° C.).

(C)

1000 g. of 35% polyurethane solution in dimethylformamide;
218 g. of water;
968 g. of dimethylformamide;
4375 g. of NaCl sieved in the same way as $Na_2SO_4$ above, average particle size=160 microns; and
105 g. of carbon black dispersion as in (A).
Paste viscosity=380 poises (20° C.).

(D)

1000 g. of 35% polyurethane solution in dimethylformamide;
158.5 g. of water;
570 g. of dimethylformamide; and
105 g. of carbon black dispersion as in (A).

Coating and movement of the web are carried out as described in Example 4, each of the coating pastes A, B and C being applied with the first coating apparatus, using a width of gap between coating knife and fabric of 0.4 mm. Paste D is applied with the second coating apparatus, in which the gap is adjusted to 1.0 mm.

The following results are obtained:

(a) Application of coating pastes A and D: Surface application of 212 g./m.$^2$ of polyurethane; permeability to water vapor of the product is 3.05 mg./cm.$_2$ hr.
(b) Application of coating pastes B and D: Application of 268 g./m.$^2$ of polyurethane; permeability to water vapor=2.8 mg./cm.$^2$ hr.
(c) (Comparison sample) Application of coating pastes C and D: Application of 208 g./m.$^2$ of polyurethane; permeability to water vapor=1.3 mg./cm.$^2$ hr.

It is clear from this comparison that the use of NaCl instead of $Na_2SO_4$ results in a substantially inferior product.

Coating the knit fabric used in Example 2 with the pastes A to D above resulted in a product analogous to that of Sample 6(a) with a soft handle and pure textile character on the rear side only when using pastes $A+D$ and $B+D$, whereas the product produced using the combination of pastes $C+D$ (comparison sample) had an irregular top elastomer coating which was sintered in patches due to difficulties of guiding the web and difficulties in the coagulation and washing apparatus, and it was therefore unusable.

EXAMPLE 7

A 35% solution of polyurethane in dimethylformamide prepared using a polyurethane which was a reaction product of polyethylene adipate (molecular weight approximately 2,000), diphenylmethane-4,4'-diisocyanate, ethylene glycol and N-methyldiethanolamine in the molar ratio of 1:3.5:2.25:0.25 and having a viscosity of 2,020 poises at 20° C. is worked up with dimethylformamide and water as in Example 1 to produce solutions of the following compositions:

Solution A:
    16% by weight of polyurethane;
    8.5% by weight of water; and
    75.5% by weight of dimethylformamide.
Solution B:
    19% by weight of polyurethane;
    8.2% by weight of water; and
    72.8% by weight of dimethylformamide.
Solution C:
    22% by weight of polyurethane;
    7.9% by weight of water; and
    70.1% by weight of dimethylformamide.

1,000 g. portions of these solutions are stirred up with different quantities of $Na_2SO_4$ to produce coating pastes $A_1$, $B_1$, $C_1$ and $A_2$, $B_2$, $C_2$, respectively. The maximum particle size of $Na_2SO_4$ was again 350 microns and the average particle size was 150 microns. A rayon fabric with a canvas weave, which has a yarn size in the warp/weft of 300/260 dtex and a corresponding thread count, of 22/20 threads per cm. and which has been slightly roughened on the rear surface, is coated with these pastes in the same manner as described in Example 1 with a coating knife adjusted to a width of gap between knife and fabric of 1.2 mm.

The pastes and the properties of the final coated samples obtained are summarized in Table 1:

TABLE 1

| Paste | From solution | Plus Na$_2$SO$_4$ (g.) | Viscosity (poises at 20° C.) | Polyurethane application (g./m.²) | Permeability to water vapor (mg./cm.² hr.) | Delamination resistance of coating* (kg./cm.) |
|---|---|---|---|---|---|---|
| A$_1$ | A | 1,000 | 44 | 160 | 3.3 | 1.2 |
| A$_2$ | A | 1,500 | 115 | 151 | 3.7 | 0.9 |
| B$_1$ | B | 1,000 | 116 | 169 | 3.0 | 1.3 |
| B$_2$ | B | 1,500 | 275 | 161 | 3.7 | 1.0 |
| C$_1$ | C | 1,000 | 278 | 190 | 2.5 | 1.7 |
| C$_2$ | C | 1,500 | 562 | 175 | 3.5 | 1.2 |

*Delamination resistance determined according to German Industrial Standard DIN 53 357.

These products of Table 1 are soft and have a good handle with a rear surface which is textile in character.

EXAMPLE 8

Coating pastes A$_1$ and A$_2$ used in Example 7 are applied in the same manner as described in Example 7 to the smooth surface of two fabrics which have been more strongly napped.

Fabric 1: Rayon cross twill, yarn size for warp/weft of 290/390 dtex; thread count of warp/weft of 29/20 threads/cm.

Fabric 2: Rayon cross twill, yarn size of warp/weft of 287/383 dtex; yarn count of warp/weft of 29/17 threads/cm.

The finished products are very soft with a good handle. They have the properties summarized in Table 2.

TABLE 2

| Fabric | Coating paste | Application (g./m.²) | Permeability to water vapor (mg./cm.² hr.) | Delamination resistance (kg./cm.) |
|---|---|---|---|---|
| 1 | A$_1$ | 142 | 4.0 | 1.5 |
| 1 | A$_2$ | 135 | 4.1 | 1.2 |
| 2 | A$_1$ | 148 | 4.3 | 1.5 |
| 2 | A$_2$ | 131 | 4.3 | 1.1 |

EXAMPLE 9

Solutions having the following compositions are prepared from the polyurethane described in Example 7:

Solution A:
 15% by weight of polyurethane;
 8.6% by weight of water;
 76.3% by weight of dimethylformamide; and
 0.1% by weight of silicone oil "PMPS."

(The silicone oil "PMPS" being used as a phenylmethyl polysiloxane having a viscosity of 500 cst. at 25° C.)

Solution B:
 20% by weight of polyurethane;
 8.0% by weight of water;
 71.9% by weight of dimethylformamide; and
 0.1% by weight of silicone oil "PMPS."

Solution C:
 25% by weight of polyurethane;
 7.5% by weight of water;
 67.4% by weight of dimethylformamide; and
 0.1% by weight of the silicone oil "PMPS."

To individual 1,000 g. portions of these solutions there are added 500 g. of Na$_2$SO$_4$ (coating pastes A$_1$, B$_1$ and C$_1$), 1,000 g. of Na$_2$SO$_4$ (coating pastes A$_2$, B$_2$ and C$_2$) or 1,500 g. of Na$_2$SO$_4$ (coating pastes A$_3$, B$_3$ and C$_3$). The resulting pastes are applied to a nylon/rayon jersey velours fabric which has been napped on one side (fabric weight=112 g./m.², bursting elongation=29.8%, bursting strength=5.8 kg. cm.) using a coating knife adjusted to a gap of 1.2 mm., and the fabrics are then worked up as in Example 1. Coating pastes A$_1$ B$_1$ and C$_1$ tend to penetrate the fabric whereas the other paste compositions lead to products which have a pure textile character on the rear or noncoated surface. In addition, products produced with coating pastes which have a high Na$_2$SO$_4$ content are much softer, and after the usual leather finishing treatment, they are eminently suitable for use as artificial leather for garments. A summary of the products is given in Table 3:

TABLE 3

| Paste | Viscosity, poises | Application of polyurethane (g./m.²) | Permeability to water vapor (mg./cm.² hr.) | Delamination resistance (kg./cm.) |
|---|---|---|---|---|
| A$_1$ | 18 | 124 | 3.4 | 0.8 |
| A$_2$ | 32 | 106 | 4.2 | 0.7 |
| A$_3$ | 105 | 99 | 4.5 | 0.5 |
| B$_1$ | 112 | 150 | 3.0 | 1.5 |
| B$_2$ | 150 | 134 | 3.9 | 1.2 |
| B$_3$ | 375 | 127 | 4.1 | 1.0 |
| C$_1$ | 580 | 206 | 2.4 | 1.8 |
| C$_2$ | 965 | 195 | 2.9 | 1.3 |
| C$_3$ | 1,280 | 180 | 3.4 | 1.3 |

EXAMPLE 10

Two coating pastes are prepared from 1000 g. of a solution of 16% by weight of the polyurethane described in Example 9, 9% by weight of water and 75% by weight of dimethylformamide by adding 1000 g. of Na$_2$SO$_4$ (coating paste 1) to the solution in one case and 1500 g. of Na$_2$SO$_4$ (coating paste 2) in the other. The Na$_2$SO$_4$ used has been passed through a sieve of mesh 350 microns and has an average particle size of 150 microns.

The fabric from Example 9 is coated with coating paste 1 by passing it over driven rollers under a coating knife with a gap between knife and fabric of 0.4 mm. After 40 seconds in air, the fabric is then passed through a water bath at 22° C. where it is rinsed with water for 80 seconds. From the water bath, the resulting coated fabric is passed between a pair of rollers which apply light pressure to press out parts of the water. The fabric is then conveyed to a second driven roller with coating knife where coating paste 2 is applied with a gap between fabric and knife adjusted to 1.5 mm. After the second coating knife, the coated fabric is passed through the atmosphere for 8 minutes and then immersed in water at 22° C. for 80 seconds and thereafter passed through another pair of rollers of which the roller in contact with the surface coating of polymer has a coarse profile. The fabric is then treated for 5 minutes with water at 22° C. to cause substantial solidification of the polyurethane. Lastly, the coated fabric is washed free from solvent and Na$_2$SO$_4$ with water at 50° C. and dried. The product obtained is found to be embossed with a coarse grain structure. The resulting leather-like article is very soft in spite of the relatively hivh application of polyurethane of 220 g./m.², and it has a permeability to water vapor of 3.7 mg./cm.² hr., and a delamination resistance of 1.8 kg./cm.

The product can thereafter be reembossed with a fine grain and then conveyed to the usual leather finishing process, or it may be raised on the coated surface by buffing, in which case a velours type artificial leather is obtained which has a very pleasant handle and a good draping quality.

The invention is hereby claimed as follows:

1. In a process for producing an artificial leather by applying a polyurethane polymer solution in an organic solvent as a coating layer onto a textile substrate, bathing the coated layer with a nonsolvent for the polymer until the layer has coagulated and then washing and drying to obtain a porous elastomeric layer, the improvement which comprises:

carrying out said coating application with a solution of said polyurethane containing 10 to 30 parts by weight of polyurethane and 300 to 1500% by weight, with reference to the polyurethane, of sodium sulfate in 90 to 70 parts by weight of an organic solvent which is miscible with water and which is a nonsolvent for sodium sulfate, the viscosity of said solution being at least 20 poises, measured at 20° C.; and subsequently washing out said solvent and said sodium sulfate from the coagulated layer and drying to form an elastomeric coating uniformly permeated with both micropores and macropores.

2. A process as claimed in Claim 1 wherein the viscosity of said solution is at least 100 poises, measured at 20° C.

3. A process as claimed in Claim 1 wherein said sodium sulfate has a particle size of up to 350 microns.

4. A process as claimed in Claim 1 wherein said textile substrate is a soft, open-meshed woven or knitted fabric.

5. A process as claimed in Claim 1 wherein said textile substrate is a bonded fibrous fleece.

6. A process as claimed in Claim 1 wherein two of said polyurethane solutions containing said sodium sulfate are applied to the substrate in successive layers.

7. A process as claimed in Claim 6 wherein both solutions are applied before coagulation with water.

8. A process as claimed in Claim 1 wherein a second polyurethane solution free of salt is applied as a successive layer after the application of said polyurethane solution containing said sodium sulfate.

9. A process as claimed in Claim 8 wherein both solutions are applied before coagulation with water.

10. A process as claimed in Claim 1 wherein the polymer layer is embossed in a partly coagulated state.

11. A process as claimed in Claim 1 wherein said solution of polyurethane consists essentially of 10 to 30 parts by weight of polyurethane and 300 to 1500% by weight, with reference to the polyurethane, of sodium sulfate in 90 to 70 parts by weight of said organic solvent, such that the viscosity of said solution is at least 100 poises, measured at 20° C., and the sodium sulfate has a particle size of 10 up to 350 microns.

12. A process as claimed in Claim 11 wherein said sodium sulfate has a particle size of about 40 to 250 microns.

References Cited

UNITED STATES PATENTS

| 3,387,989 | 6/1968 | West et al. | 117—161 KP |
| 3,486,968 | 12/1969 | Mater | 117—161 KP |
| 3,714,307 | 1/1973 | Shikada | 117—63 |

FOREIGN PATENTS

| 1,565,893 | 3/1969 | France. |

WILLIAM D. MARTIN, Primary Examiner

T. G. DAVIS, Assistant Examiner

U.S. Cl. X.R.

117—10, 76 T, 135.5, 140 A, 145, 161 KP

Notice of Adverse Decision in Interference

In Interference No. 99,308, involving Patent No. 3,846,156, G. Seibert and H. Pitowski, PROCESS FOR PRODUCING A SOFT, DRAPABLE ARTIFICIAL LEATHER, final judgment adverse to the patentees was rendered Apr. 21, 1977, as to claims 1–12.

[*Official Gazette August 2, 1977.*]